US010120586B1

(12) United States Patent
Bruce et al.

(10) Patent No.: US 10,120,586 B1
(45) Date of Patent: *Nov. 6, 2018

(54) MEMORY TRANSACTION WITH REDUCED LATENCY

(71) Applicant: BITMICRO LLC, Reston, VA (US)

(72) Inventors: Rey H. Bruce, San Jose, CA (US);
Ricardo H. Bruce, Fremont, CA (US);
Elsbeth Lauren Tagayo-Villapana, Cambridge (GB)

(73) Assignee: BiTMICRO, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,700

(22) Filed: Feb. 7, 2015

Related U.S. Application Data

(63) Continuation of application No. 12/270,626, filed on Nov. 13, 2008, now Pat. No. 8,959,307.
(Continued)

(51) Int. Cl.
*G06F 12/00* (2006.01)
*G06F 3/06* (2006.01)
*G06F 13/28* (2006.01)

(52) U.S. Cl.
CPC .......... *G06F 3/0611* (2013.01); *G06F 3/0656* (2013.01); *G06F 3/0688* (2013.01); *G06F 13/28* (2013.01); *G06F 2212/6022* (2013.01)

(58) Field of Classification Search
CPC .... G06F 3/0611; G06F 3/0688; G06F 3/0656; G06F 13/28; G06F 2212/6022
See application file for complete search history.

(56) References Cited

U.S. PATENT DOCUMENTS

| | | | |
|---|---|---|---|
| 4,402,040 | A | 8/1983 | Evett |
| 4,403,283 | A | 9/1983 | Myntti et al. |

(Continued)

FOREIGN PATENT DOCUMENTS

| | | | |
|---|---|---|---|
| JP | 2005142859 A | | 6/2005 |
| JP | 2005-309847 | | 11/2005 |

(Continued)

OTHER PUBLICATIONS

USPTO Notice of Allowability & attachment(s) dated Jan. 7, 2013 for U.S. Appl. No. 12/876,247.
(Continued)

*Primary Examiner* — Kalpit Parikh
(74) *Attorney, Agent, or Firm* — Jackson Walker L.L.P.

(57) ABSTRACT

A solution for performing reduced latency memory read transactions is disclosed. In one example, a storage apparatus has a memory array that includes: a flash device having a data register, a memory interface coupled to the memory array and a buffer set that includes at least one buffer suitable for use as a prefetch buffer. The memory interface, in response to a memory read transaction request, performs a read operation and, if stored data exists within the memory array that meets a prefetch selection criterion, also performs an internal read operation. The internal read operation includes allocating a prefetch buffer in the buffer set and storing the data as prefetch data in the prefetch buffer. If the memory interface receives a second memory read transaction request for data that is currently available as prefetch data, the memory interface responds by performing a forwarding transaction that includes retrieving the prefetch data from the prefetch buffer and forwarding the prefetch data to a host.

23 Claims, 4 Drawing Sheets

US 10,120,586 B1
Page 2

Related U.S. Application Data

(60) Provisional application No. 60/988,728, filed on Nov. 16, 2007.

(56) References Cited

U.S. PATENT DOCUMENTS

| | | |
|---|---|---|
| 4,752,871 A | 6/1988 | Sparks |
| 4,967,344 A | 10/1990 | Scavezze et al. |
| 5,111,058 A | 5/1992 | Martin |
| RE34,100 E | 10/1992 | Hartness |
| 5,222,046 A | 6/1993 | Kreifels et al. |
| 5,297,148 A | 3/1994 | Harari et al. |
| 5,339,404 A | 8/1994 | Vandling, III |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,737,742 A | 4/1998 | Achiwa et al. |
| 5,765,023 A | 6/1998 | Leger et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,818,029 A | 10/1998 | Thomson |
| 5,819,307 A | 10/1998 | Iwamoto et al. |
| 5,822,251 A | 10/1998 | Bruce et al. |
| 5,864,653 A | 1/1999 | Tavallaei et al. |
| 5,870,627 A | 2/1999 | O'Toole et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,930,481 A | 7/1999 | Benhase |
| 5,933,849 A | 8/1999 | Srbljic et al. |
| 5,943,421 A | 8/1999 | Grabon |
| 5,956,743 A | 9/1999 | Bruce et al. |
| 5,978,866 A | 11/1999 | Nain |
| 5,987,621 A | 11/1999 | Duso |
| 6,000,006 A | 12/1999 | Bruce et al. |
| 6,076,137 A | 6/2000 | Asnaashari |
| 6,098,119 A | 8/2000 | Surugucchi et al. |
| 6,128,303 A | 10/2000 | Bergantino |
| 6,138,200 A | 10/2000 | Ogilvie |
| 6,138,247 A | 10/2000 | McKay et al. |
| 6,151,641 A | 11/2000 | Herbert |
| 6,215,875 B1 | 4/2001 | Nohda |
| 6,230,269 B1 | 5/2001 | Spies et al. |
| 6,298,071 B1 | 10/2001 | Taylor et al. |
| 6,341,342 B1 | 1/2002 | Thompson et al. |
| 6,363,441 B1 | 3/2002 | Bentz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,452,602 B1 | 9/2002 | Morein |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,601,126 B1 | 7/2003 | Zaidi et al. |
| 6,678,754 B1 | 1/2004 | Soulier |
| 6,728,840 B1 | 4/2004 | Shatil et al. |
| 6,744,635 B2 | 6/2004 | Portman et al. |
| 6,785,746 B1 | 8/2004 | Mahmoud et al. |
| 6,757,845 B2 | 12/2004 | Bruce |
| 6,857,076 B1 | 2/2005 | Klein |
| 6,901,499 B2 | 5/2005 | Aasheim et al. |
| 6,961,805 B2 | 11/2005 | Lakhani et al. |
| 6,970,446 B2 | 11/2005 | Krischer et al. |
| 6,970,890 B1 | 11/2005 | Bruce et al. |
| 6,973,546 B2 | 12/2005 | Johnson |
| 6,980,795 B1 | 12/2005 | Hermann et al. |
| 7,103,684 B2 * | 9/2006 | Chen et al. ............... 710/62 |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 6/2008 | Fujimoto et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,474,926 B1 | 1/2009 | Carr et al. |
| 7,478,186 B1 | 1/2009 | Onufryk et al. |
| 7,490,177 B2 | 2/2009 | Kao |
| 7,496,699 B2 | 2/2009 | Pope et al. |
| 7,500,063 B2 * | 3/2009 | Zohar et al. ............... 711/137 |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,620,749 B2 | 11/2009 | Biran et al. |
| 7,624,239 B2 | 11/2009 | Bennett et al. |
| 7,660,941 B2 | 2/2010 | Lee et al. |
| 7,668,925 B1 | 2/2010 | Liao et al. |
| 7,676,640 B2 | 3/2010 | Chow |
| 7,716,389 B1 | 5/2010 | Bruce et al. |
| 7,719,287 B2 | 5/2010 | Marks et al. |
| 7,729,730 B2 | 6/2010 | Orcine et al. |
| 7,743,202 B2 | 6/2010 | Tsai et al. |
| 7,765,359 B2 * | 7/2010 | Kang et al. ............... 711/103 |
| 7,877,639 B2 | 1/2011 | Hoang |
| 7,913,073 B2 | 3/2011 | Choi |
| 7,921,237 B1 | 4/2011 | Holland et al. |
| 7,934,052 B2 | 4/2011 | Prins et al. |
| 7,958,295 B1 | 6/2011 | Liao et al. |
| 7,979,614 B1 | 7/2011 | Yang |
| 7,996,581 B2 | 8/2011 | Bond et al. |
| 8,010,740 B2 | 10/2011 | Arcedera et al. |
| 8,032,700 B2 | 10/2011 | Bruce et al. |
| 8,156,320 B2 | 4/2012 | Borras |
| 8,161,223 B1 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,225,022 B2 | 7/2012 | Caulkins |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 4/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |

(56) References Cited

U.S. PATENT DOCUMENTS

| | | |
|---|---|---|
| 8,583,868 B2 | 11/2013 | Belluomini et al. |
| 8,677,042 B2 | 3/2014 | Gupta et al. |
| 8,707,134 B2 | 4/2014 | Takahashi et al. |
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0073324 A1 | 6/2002 | Hsu et al. |
| 2002/0083262 A1 | 6/2002 | Fukuzumi |
| 2002/0141244 A1 | 10/2002 | Bruce et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0182576 A1 | 9/2003 | Morlang et al. |
| 2003/0188100 A1 | 10/2003 | Solomon et al. |
| 2003/0204675 A1* | 10/2003 | Dover et al. ........... 711/137 |
| 2003/0217202 A1 | 11/2003 | Zilberman et al. |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0055481 A1 | 3/2005 | Chou et al. |
| 2005/0078016 A1 | 4/2005 | Neff |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2006/0004957 A1 | 1/2006 | Hand, III et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1 | 3/2006 | Anand et al. |
| 2006/0095709 A1 | 5/2006 | Achiwa |
| 2006/0129876 A1 | 6/2006 | Uemura |
| 2006/0173970 A1 | 8/2006 | Pope et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0005481 A1 | 1/2008 | Walker |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0140724 A1 | 6/2008 | Flynn et al. |
| 2008/0147963 A1 | 6/2008 | Tsai et al. |
| 2008/0189466 A1 | 8/2008 | Hemmi |
| 2008/0218230 A1 | 9/2008 | Shim |
| 2008/0228959 A1 | 9/2008 | Wang |
| 2008/0276037 A1 | 11/2008 | Chang et al. |
| 2008/0301256 A1 | 12/2008 | McWilliams et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1 | 6/2011 | Jones et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2012/0005405 A1 | 1/2012 | Wu et al. |
| 2012/0005410 A1 | 1/2012 | Ikeuchi |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0159029 A1 | 6/2012 | Krishnan et al. |
| 2012/0161568 A1 | 6/2012 | Umemoto et al. |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pomeroy |
| 2013/0019053 A1 | 1/2013 | Somanache et al. |
| 2013/0073821 A1 | 3/2013 | Flynn et al. |
| 2013/0094312 A1 | 4/2013 | Jan et al. |
| 2013/0099838 A1 | 4/2013 | Kim et al. |
| 2013/0111135 A1 | 5/2013 | Bell, Jr. et al. |
| 2013/0206837 A1 | 8/2013 | Szu |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0212425 A1 | 8/2013 | Blaine et al. |

(56) References Cited

U.S. PATENT DOCUMENTS

| | | | |
|---|---|---|---|
| 2013/0246694 | A1 | 9/2013 | Bruce et al. |
| 2013/0254435 | A1 | 9/2013 | Shapiro et al. |
| 2013/0262750 | A1 | 10/2013 | Yamasaki et al. |
| 2013/0282933 | A1 | 10/2013 | Jokinen et al. |
| 2013/0304775 | A1 | 11/2013 | Davis et al. |
| 2013/0339578 | A1 | 12/2013 | Ohya et al. |
| 2013/0339582 | A1 | 12/2013 | Olbrich et al. |
| 2013/0346672 | A1 | 12/2013 | Sengupta et al. |
| 2014/0068177 | A1 | 3/2014 | Raghavan |
| 2014/0095803 | A1 | 4/2014 | Kim et al. |
| 2014/0104949 | A1 | 4/2014 | Bruce et al. |
| 2014/0108869 | A1 | 4/2014 | Brewerton et al. |
| 2014/0189203 | A1 | 7/2014 | Suzuki et al. |
| 2014/0258788 | A1 | 9/2014 | Maruyama |
| 2014/0285211 | A1 | 9/2014 | Raffinan |
| 2014/0331034 | A1 | 11/2014 | Ponce et al. |
| 2015/0006766 | A1 | 1/2015 | Ponce et al. |
| 2015/0012690 | A1 | 1/2015 | Bruce et al. |
| 2015/0032937 | A1 | 1/2015 | Salessi |
| 2015/0032938 | A1 | 1/2015 | Salessi |
| 2015/0067243 | A1 | 3/2015 | Salessi et al. |
| 2015/0149697 | A1 | 5/2015 | Salessi et al. |
| 2015/0149706 | A1 | 5/2015 | Salessi et al. |
| 2015/0153962 | A1 | 6/2015 | Salessi et al. |
| 2015/0169021 | A1 | 6/2015 | Salessi et al. |
| 2015/0261456 | A1 | 9/2015 | Alcantara et al. |
| 2015/0261475 | A1 | 9/2015 | Alcantara et al. |
| 2015/0261797 | A1 | 9/2015 | Alcantara et al. |
| 2015/0370670 | A1 | 12/2015 | Lu |
| 2015/0371684 | A1 | 12/2015 | Mataya |
| 2015/0378932 | A1 | 12/2015 | Souri et al. |
| 2016/0026402 | A1 | 1/2016 | Alcantara et al. |
| 2016/0027521 | A1 | 1/2016 | Lu |
| 2016/0041596 | A1 | 2/2016 | Alcantara et al. |

FOREIGN PATENT DOCUMENTS

| | | |
|---|---|---|
| TW | 200428219 A | 12/2004 |
| TW | I420316 | 12/2013 |
| WO | WO 94/06210 | 3/1994 |

OTHER PUBLICATIONS

Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Office Action for U.S. Appl. No. 13/253,912 dated Jul. 16, 2014.
Office Action for U.S. Appl. No. 13/475,878, dated Jun. 23, 2014.
Office Action for U.S. Appl. No. 12/876,113 dated Jul. 11, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Apr. 4, 2011.
Office Action for U.S. Appl. No. 12/270,626 dated Dec. 18, 2013.
Office Action for U.S. Appl. No. 12/270,626 dated Mar. 15, 2013.
Office Action for U.S. Appl. No. 12/270,626 dated Aug. 23, 2012.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/215,414 dated Jun. 4, 2015.
Office Action for U.S. Appl. No. 14/217,467 dated Apr. 27, 2015.
Office Action for U.S. Appl. No. 14/217,436 dated Sep. 11, 2015.
Office Action for U.S. Appl. No. 12/270,626 dated Feb. 3, 2012.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.
Office Action dated Sep. 28, 2015 for U.S. Appl. No. 14/689,045.
Office Action dated Dec. 5, 2014 for U.S. Appl. No. 14/038,684.
Office Action dated Oct. 8, 2015 for U.S. Appl. No. 14/217,291.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution. http://www.design-reuse.com/news/35111/nxgn-data-intelligent-solutions.html, printed on Feb. 13, 2016.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Notice of allowance/allowability for U.S. Appl. No. 13/253,912 dated Mar. 21, 2016.
Notice of allowance/allowability for U.S. Appl. No. 14/803,107 dated Mar. 28, 2016.
Office Action for U.S. Appl. No. 14/217,334 dated Apr. 4, 2016.
Notice of allowance/allowability for U.S. Appl. No. 14/217,041 dated Apr. 11, 2016.
Office Action for U.S. Appl. No. 14/616,700 dated Mar. 8, 2016 (applied by Examiner in this present application).
Notice of allowance/allowability for U.S. Appl. No. 14/217,467 dated Apr. 20, 2016.
Office Action for U.S. Appl. No. 14/217,249 dated Apr. 21, 2016.
Notice of allowance/allowability for U.S. Appl. No. 14/214,216 dated.
Office Action for U.S. Appl. No. 14/217,291 dated Jun. 15, 2016.
Office Action for U.S. Appl. No. 14/215,414 dated May 20, 2016.
Office Action for U.S. Appl. No. 14/616,700 dated May 20, 2016 (Applied by Examiner).

(56) References Cited

OTHER PUBLICATIONS

Office Action for U.S. Appl. No. 14/689,019 dated May 20, 2016.
Advisory Action for U.S. Appl. No. 14/217,316 dated May 19, 2016.
Advisory Action for U.S. Appl. No. 14/217,334 dated Jun. 13, 2016.
Notice of allowance/allowability for U.S. Appl. No. 14/214,216 dated Apr. 27, 2016.
Notice of allowance/allowability for U.S. Appl. No. 14/217,436 dated May 6, 2016.
Notice of allowance/allowability for U.S. Appl. No. 14/217, 365 dated Oct. 18, 2016.
Office Action for U.S. Appl. No. 14/616,700 dated Oct. 20, 2016 (Issued by Examiner in this patent application).
Office Action for U.S. Appl. No. 14/855,245 dated Oct. 26, 2016.
Office Action for U.S. Appl. No. 14/217, 249 dated Oct. 28, 2016.
Office Action for U.S. Appl. No. 14/217,316 dated Aug. 25, 2016.
Office Action for U.S. Appl. No. 14/690,305 dated Aug. 26, 2016.
Office Action for U.S. Appl. No. 14/217,096 dated Jul. 12, 2016.
Notice of Allowance for U.S. Appl. No. 14/217,399 dated Jul. 20, 2016.
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Working Draft American National Standard Project T10/1601-D Information Technology Serial Attached SCSI—1.1 (SAS—1.1), Mar. 13, 2004 Revision 4.
Advisory Action for U.S. Appl. No. 14/217,291 dated Sep. 9, 2016.
Advisory Action for U.S. Appl. No. 14/217,291 dated Sep. 16, 2016.
Notice of Allowance for U.S. Appl. No. 14/217,291 dated Sep. 12, 2016.
Advisory Action for U.S. Appl. No. 14/217,291 dated Sep. 12, 2016.
Notice of Allowance for U.S. Appl. No. 14/217,291 dated Sep. 23, 2016.
Advisory Action for U.S. Appl. No. 14/217,291 dated Oct. 13, 2016.
Office Action for U.S. Appl. No. 14/217,291 dated Sep. 26, 2016.
Office Action for U.S. Appl. No. 14/217,291 dated Oct. 6, 2016.
Office Action for U.S. Appl. No. 14/616,700 dated Jun. 2, 2017 (issued by Examiner in this application).
Office Action for U.S. Appl. No. 15/268,533 dated Jun. 2, 2017.
Office Action for U.S. Appl. No. 15/268,536 dated Apr. 27, 2017.
Office Action for U.S. Appl. No. 15/368,598 dated May 19, 2017.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Advisory Action for U.S. Appl. No. 14/690,305 dated Nov. 25, 2016.
Office Action for U.S. Appl. No. 14/216,937 dated Aug. 15, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version Apr. 1, 2013, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Office Action for U.S. Appl. No. 14/866,946 dated Jul. 27, 2017.
Robert Cooksey et al., A Stateless, Content-Directed Data Prefetching Mechanism, 2002.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,305 dated Feb. 10, 2017.
Office Action for U.S. Appl. No. 14/690,349 dated Feb. 8, 2017.
Advisory Action for U.S. Appl. No. 14/689,019 dated Feb. 17, 2017.
Office Action for U.S. Appl. No. 14/690,349 dated Feb. 27, 2017.

\* cited by examiner

MEMORY TRANSACTION WITH REDUCED LATENCY

CROSS-REFERENCE TO RELATED APPLICATIONS

This application is a continuation application of United States Application, entitled "Reduced Latency Memory Read Transactions In Storage Devices", having a filing date of 13 Nov. 2008 and Ser. No. 12/270,626, which claims the benefit of and a priority to United States Provisional Application, entitled "Apparatus and Method for Performing Reduced Latency Memory Read Transactions", having a filing date of 16 Nov. 2007 and Ser. No. 60/988,728. Application Ser. Nos. 12/270,626 and 60/988,728 are hereby fully incorporated herein by reference.

FIELD OF INVENTION

The present invention relates to solutions for achieving reduced latency memory read transactions in storage or memory devices. More particularly, these solutions achieve reduced latency memory read transactions by allocating a prefetch buffer from a set of buffers that includes at least one buffer, such as a data register, from a flash device.

BACKGROUND

The relentless increase in Internet usage and e-commerce as well as the proliferation of networked digital computing devices has driven the demand for not only large capacity data storage but also high data availability and sophisticated data management, such as storage virtualization. To meet these needs, many vendors offer networked attached storage (NAS) devices, storage array network (SAN) devices and sophisticated servers that have directly attached arrays of mass storage. These solutions can provide users with managed access to their data directly from their computing device or through a network and with high data availability. These solutions are not without challenges, however.

One challenge includes reducing latency in memory read transactions. For example, in enterprise database applications or in on-line transaction processing, massive amounts of data may need to be sorted or filtered. This requires that these applications have access to storage devices that can not only provide large data capacity but perform low latency memory read transactions for data stored randomly in the storage devices. Another example includes on-demand video applications. These applications must have access to storage devices that can retrieve large amounts of sequential data, such as video, with low latency and in multiple streams in order to maximize viewing enjoyment of the video in real-time by multiple end-users.

Yet another example requiring reduced latency in memory read transactions includes a storage virtualization application that can aggregate a pool of storage that can be used by requesting hosts. This pool of storage may include a set of storage devices that may be interconnected through a LAN, WAN or both, and that may use mass storage devices that have relatively high memory transaction read latency, such as hard disk drives (HDD), or that are coupled to a network with a relatively low network bandwidth.

Consequently, a need exists for a storage device that can provide low latency memory read transactions in a variety of applications.

SUMMARY

A solution for performing reduced latency memory read transactions is disclosed. In one example, this solution may include a storage apparatus having a memory array that includes: a flash device having a data register, a memory interface coupled to the memory array and a buffer set that includes at least one buffer that is suitable for use as a prefetch buffer. The buffer set, where one buffer in the buffer set includes a data register, is coupled to the memory interface. The memory interface, in response to a memory read transaction request, performs a read operation and, if stored data exists within the memory array that meets at least one prefetch selection criterion, also performs an internal read operation. The internal read operation includes allocating a prefetch buffer in the buffer set and storing the data as prefetch data in the prefetch buffer. If the memory interface receives a second memory read transaction request for data and if the data is currently available as prefetch data in the prefetch buffer, the memory interface responds by performing a forwarding transaction that includes retrieving the prefetch data from the prefetch buffer and forwarding the prefetch data to a host.

DETAILED DESCRIPTION OF THE INVENTION

While the invention has been described in conjunction with a specific best mode, it is to be understood that many alternatives, modifications, and variations will be apparent to those skilled in the art in light of the following description. Those skilled in the art would recognize after reviewing this application that the embodiments disclosed, including embodiments directed to methods or processes, can be implemented using various types of integrated circuits, including microprocessors, programmable logic arrays, such as FPGAs, discrete active and passive devices, such as logic gates and logic functions, or any combination of these devices. The use of these devices in the embodiments of the invention shown below would not require undue experimentation or further invention. In addition, for clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Various embodiments of the present invention disclosed herein pertain to achieving reduced memory transaction read latency in a memory device, such as a storage apparatus that employs a memory interface coupled to a memory array.

Reduced read latency may be achieved in such a storage apparatus by allocating a buffer from a set of at least one buffer, such as a data register included in a flash device, and by using this allocated buffer to store prefetch data. The number of buffers allocated as prefetch buffers for storing prefetch data may be selected at the time of manufacture, at the time of boot-up or dynamically as needed by the storage apparatus. In this example, this flash device comprises at least a portion of the memory array.

Figure 1:
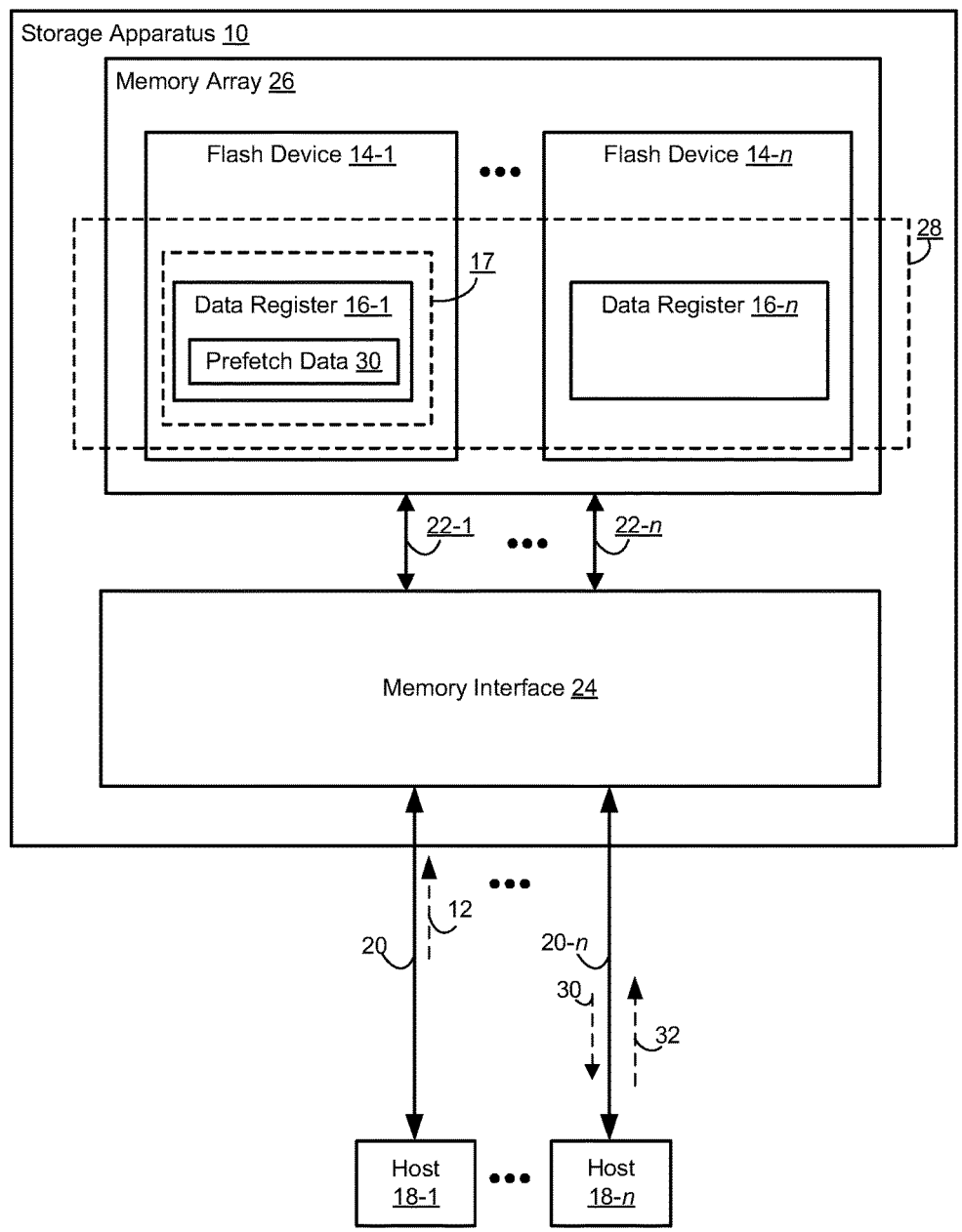
FIG. 1 is a block diagram of a reduced latency storage apparatus in accordance with a first embodiment of the present invention.

Referring now to FIG. 1, reduced memory read transaction latency may be achieved by using a storage apparatus 10 that includes a memory interface 24 coupled via a memory bus 22-1 to a memory array 26. Memory array 26 includes at least one flash device, such as flash devices 14-1 through 14-n, where n may be any number greater than zero (0). The flash devices may include data registers. For example, flash devices 14-1 and 14-n may respectively include data registers 16-1 through 16-n. The data registers form part of buffer set 28. The term "flash device" is intended to include any form of non-volatile memory that includes a set of non-volatile memory cells, including multi-level memory cells. This flash device permits read and write operations to be performed on these memory cells according to a protocol supported by the flash device. This flash device may be implemented using a flash memory device that complies with the Open NAND Flash Interface Specification, commonly referred to as ONFI Specification. The term "ONFI Specification" is a known device interface standard created by a consortium of technology companies, called the "ONFI Workgroup". The ONFI Workgroup develops open standards for NAND flash memory devices and for devices that communicate with these NAND flash memory devices. The ONFI Workgroup is headquartered in Hillsboro, Oreg. Using a flash device that complies with the ONFI Specification is not intended to limit the embodiment disclosed. One of ordinary skill in the art having the benefit of this disclosure would readily recognize that other types of flash devices employing different device interface protocols may be used, such as protocols compatible with the standards created through the Non-Volatile Memory Host Controller Interface ("NVMHCI") working group. Members of the NVMHCI working group include Intel Corporation of Santa Clara, Calif., Dell Inc. of Round Rock, Tex. and Microsoft Corporation of Redmond, Wash.

Memory interface 24 responds to a memory read transaction request 12 received via bus 20 from host 18-1 by performing on memory array 26 a memory operation that corresponds to the transaction requested by host 18-1. For example, if memory interface 24 receives memory read transaction request 12, memory interface 24 performs a read operation on memory array 26 and returns the result of the read operation, such as read data, along bus 20 to host 18-1. Data returned as a result of the read operation is hereinafter called "read data". Memory interface 24 may also perform an internal read operation if data exists in memory array 26 that meets at least one prefetch selection criterion. This prefetch selection criterion may include a relationship between read data, and a data portion existing in memory array 26, named "stored data". The type of relationship between read data and stored data is not intended to be limiting in any way. Any type of relationship may be used that increases the likelihood that the stored data selected for prefetching will be later requested by a host coupled to a memory interface 24, such as host 18-1. For example, this prefetch selection criterion may be met if stored data exists that has a memory address that differs from the read data within a selected memory address range. In another example, memory interface 24 determines whether the prefetch selection criterion is met by determining whether any stored data exists in memory array 26 that has a memory address within the same page as a memory address associated with the read data.

The term "host", such as host 18-1 shown in this embodiment, means any device that has the ability to transmit a memory read transaction request to storage apparatus 10. For example, this may include host 18-1 that can generate a memory read transaction request 12 and that can receive a response resulting from the processing of memory read transaction request 12 by memory interface 24. Memory interface 24 may process memory transactions from more than one requesting device, such as host 18-1 through host 18-n. For example, as shown in FIG. 1, host 18-1 may generate a memory read transaction request 12, while another host 18-n may receive a response, such as prefetch data 30, that is a result of another subsequent memory read transaction request 32 sent by host 18-n.

The term "data portion" is intended to refer to any data size granularity used by storage apparatus 10 to address data stored in memory array 26. For example, data may be addressed in increments that may include a flash page, flash block, a file or the like.

If memory interface 24 determines the prefetch selection criterion is met, it initiates an internal read operation. This internal read operation includes memory interface 24 retrieving data that meets the prefetch selection criterion from memory array 26. Memory interface 24 may perform this internal read operation without host prompting. However, if memory interface 24 determines the prefetch selection criterion has not been met, memory interface 24 does not perform this internal read operation. Data retrieved from memory array 26 that meets the prefetch selection criterion is hereinafter called "prefetch data".

As part of the internal read operation, memory interface 24 allocates at least one buffer from buffer set 28 to store prefetch data 30. The number of buffers allocated by memory interface 24 as prefetch buffers for storing prefetch data may be selected at the time of manufacture, at the time of initialization or dynamically as needed by the storage apparatus. In one implementation, the number of buffers allocated as prefetch buffers may be initially selected by memory interface 24. Memory interface 24 may then dynamically adjust the number of buffers after initialization, depending on an amount of storage needed for data treated as prefetch data during the processing of memory read transaction requests. For example in FIG. 1, memory interface 24 may allocate data register 16-1 as a storage space suitable for storing prefetch data 30. This action may render non-allocated buffers, such as data registers 16-n in buffer set 28, available to storage apparatus 10 for other memory uses as needed. Buffers allocated for storing prefetch data, such as buffer 16-1 are hereinafter called "prefetch buffers". Storing prefetch data 30 in a prefetch buffer, such as prefetch buffer 17, renders prefetch data 30 readily available to a requesting host if requested by the host, such as through a subsequent memory read transaction request.

Allocation of a prefetch buffer in the above manner is not to be taken as a limitation in any way. One of ordinary skill in the art having the benefit of this disclosure may use other techniques or procedures to allocate a buffer as a prefetch buffer for storing prefetch data. For example, memory array 26 may further include at least one HDD, which is not shown to avoid overcomplicating this disclosure. During initialization, memory interface 24 operating under program control may by default prefetch data from random areas in this HDD. This configuration option may be preferable when low latency performance during random access is required, such as in database applications. Another option may include configuring memory interface 24 through program code to provide an option in the form of a vendor-specific interface command to allow a host, such as host 18-1, to select the prefetching method to be used by memory interface 24 during initialization. For instance, if storage apparatus 10 will be used to store large files that tend to be stored sequentially, such as video files, memory interface 24 may be configured to prefetch sequential data rather than random data. To reduce initialization time of storage apparatus 10, these prefetching options during initialization may be disabled. In another possible configuration, storage apparatus 10 may support a host-controlled non-volatile cache command set. This allows a host, such as host 18-1, to keep selected data in low latency non-volatile memory that may form a portion of memory array 26, such as flash devices 14-1 through 14-*n*, rendering this selected data to be available as prefetch data during initialization. During initialization, memory interface 24** operating under the program control detects this selected data and automatically prefetches this data by storing the data in a prefetch buffer.

If memory interface 24 receives memory read transaction request 32, which may be subsequent to memory read transaction request 12, and the data requested by memory read transaction request 32 is currently available in prefetch buffer 17 as prefetch data 30, memory interface 24 will initiate a forwarding transaction, reducing the read latency of the memory read transaction resulting from memory read transaction request 32. This forwarding transaction includes retrieving the prefetch data previously stored in a prefetch buffer, such as prefetch data 30 and prefetch buffer 17, respectively, and forwarding prefetch data 30 to the requesting host, such as host 18-*n***.

Storage apparatus 10 also includes a data transmission conduit, such as a memory bus 22-1, for coupling memory interface 24 and memory array 26. Memory interface 24 uses memory bus 22-1 as a conduit for transferring data between memory interface 24 and memory array 26. Memory bus 22-1 may include additional memory bus 22-*n*, where n may be any number greater than zero. Additional memory buses, such as memory bus 22-*n*, may be implemented to accompany an expansion of memory array 26. Memory bus 22-1 though 22-*n* are provided as one possible implementation feature and are not intended to be limiting in any way. Bus 20 may be used to couple host 18-1 to storage apparatus 10. Additional buses, such as bus 20-*n*, may be implemented to enable additional hosts, such as host 18-*n*, to communicate with memory interface 24.

Figure 2:
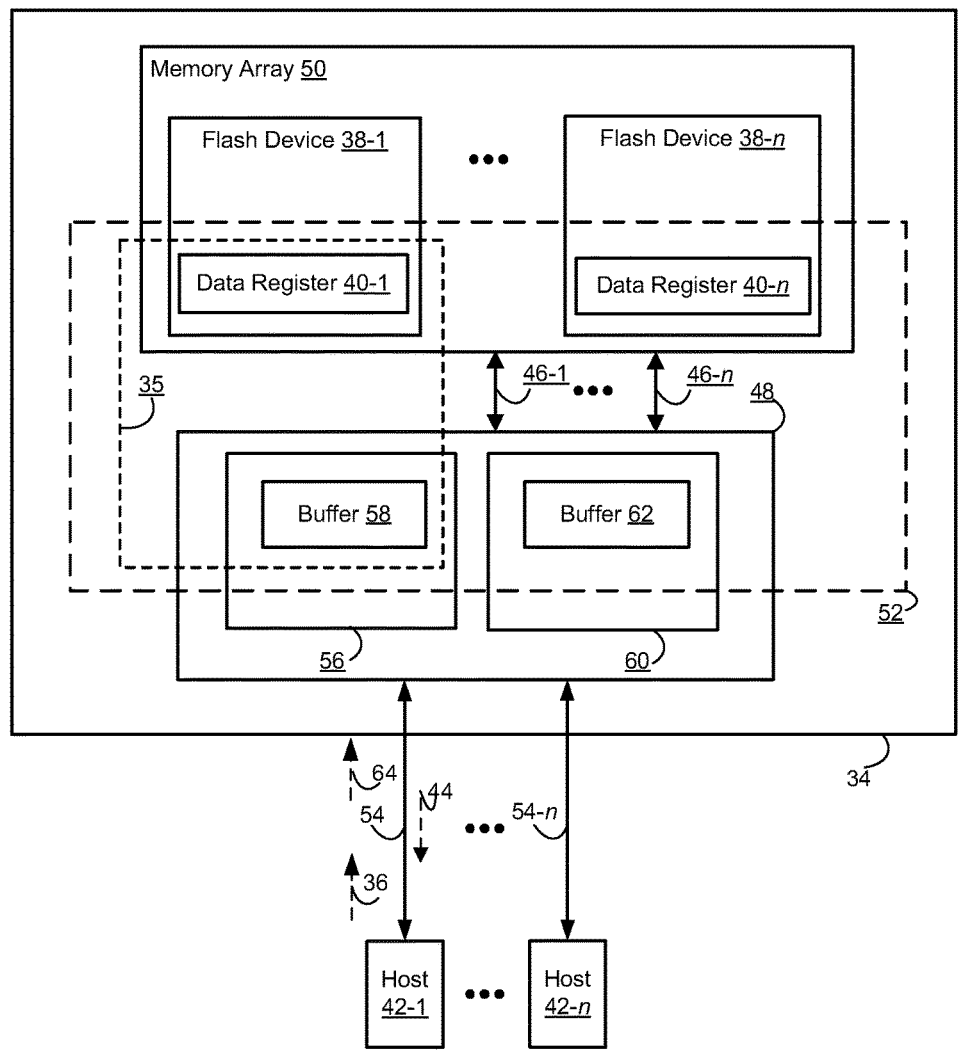
FIG. 2 is a block diagram of a reduced latency memory interface for use in a storage apparatus in accordance with a second embodiment of the present invention.

FIG. 2 illustrates another embodiment of a storage apparatus 34 that supports prefetching transactions and that employs a reduced latency memory interface 48. Storage apparatus 34 includes a memory array 50, which is coupled to memory interface 48 via a memory bus 46. Memory interface 48 is responsive to a memory read transaction request 36 sent via bus 44 from a host 42, and enables storage apparatus 34 to perform reduced latency memory transactions in response to receiving second memory read transaction request 64. In this embodiment, memory interface 48 includes a DMA controller 56 and flash memory controller 60. Buffer set 52 includes data registers 40-1 to 40-*n* from flash devices 38-1 through 38-*n*, respectively; at least one buffer from DMA controller 56, such as buffer 58; at least one buffer from flash memory controller 60, such as buffer 62**; or any combination of these data registers and buffers. As previously described, a prefetch buffer is a data store that has been allocated to store prefetch data.

The number of buffers allocated as prefetch buffers may be selected at the time of manufacture, during initialization or during the processing of memory operations. In one example, memory interface 48 may initially allocate a selected number of buffers at the time of initialization, and then dynamically adjust the number of buffers allocated as prefetch buffers after initialization, depending on an amount of storage needed for data treated as prefetch data during the processing of memory read transaction requests. This example is not intended to limit the various embodiments disclosed herein. Other embodiments for allocating a selected number of buffers that may be applicable to the example shown in FIG. 2 have been previously disclosed in FIG. 1. In addition, the number of buffers allocated as prefetch buffers may depend on an amount of storage needed for the prefetch data. For instance, memory interface 48 may allocate data register 40-1 and buffer 58 as storage space suitable for storing prefetch data 44. This action may also render non-allocated buffers, such as data registers 40-*n* and buffer 62 in buffer set 52 available to storage apparatus 34 for other memory uses as needed. Buffers allocated for storing prefetch data, such as buffer 58 and data register 40-1 are hereinafter called "prefetch buffers".

Memory array 50, host 42-1 through 42-*n*, flash devices 38-1 through 38-*n*, bus 46-1 through 46-*n*, memory read transaction request 36, second memory read transaction request 64 and memory bus 46-1 through 46-***n* may be implemented to have substantially the same function and structure as memory array 26, host 18-1 through 18-*n*, flash devices 16-1 though 16-*n*, bus 20 through 20-*n*, memory read transaction request 12, second memory read transaction request 32 and memory bus 22-1 through 22-***n* respectively, disclosed above with respect to FIG. 1.

In this embodiment, buffer set 52 includes buffer 58 and buffer 62. Like data registers 40-1 through 40-*n*, buffers 58 and 62 form part of buffer set 52 and can be used as prefetch buffers if memory interface 48 allocates these buffers as prefetch buffers. Otherwise, memory interface 24 in FIG. 1 is similar to memory interface 48 in function. For example, when prefetch data 44 is found during an internal read operation, memory interface 48 stores prefetch data 44 into prefetch buffer 35, such as buffer 58 and data register 40-1. Also, if memory interface 48 receives a second memory read transaction request 64, which may be subsequent to the earlier memory read transaction request 36, for data and this data has been previously stored as prefetch data, such as prefetch data 54, and prefetch data 54 is stored in prefetch buffer 35, memory interface 48 initiates a forwarding transaction. This forwarding transaction is similar to the forwarding transaction described earlier with respect to the embodiment corresponding to FIG. 1, above. However, unlike the forwarding transaction described in with respect to FIG. 1 which only shows data registers which may be allocated as prefetch buffers, the forwarding transaction here may include obtaining prefetch data from any of the buffers in buffer set 52 if memory interface 48** allocates those buffers as prefetch buffers.

For example, if the data requested in the second memory read transaction 64 has been stored as prefetch data 44, and prefetch data 44 is stored in buffer 58, the forwarding transaction includes retrieving prefetch data 44 from buffer 58 and forwarding prefetch data 44 to the host that sent the second memory read transaction request. In another example, if the data requested in the second memory read transaction request 64 is stored as prefetch data 44, and prefetch data 44 is stored in data register 40-1, the forwarding transaction includes retrieving prefetch data 44 from data register 40-1 and forwarding prefetch data 44 to the host that sent the second memory read transaction request. Thus, memory interface 48 may perform an internal read operation and forwarding transaction using any of the buffers, such as data registers 40-1 through 40-n, buffer 58, and buffer 62 that memory interface 48 has allocated as prefetch buffers.

Figure 3:
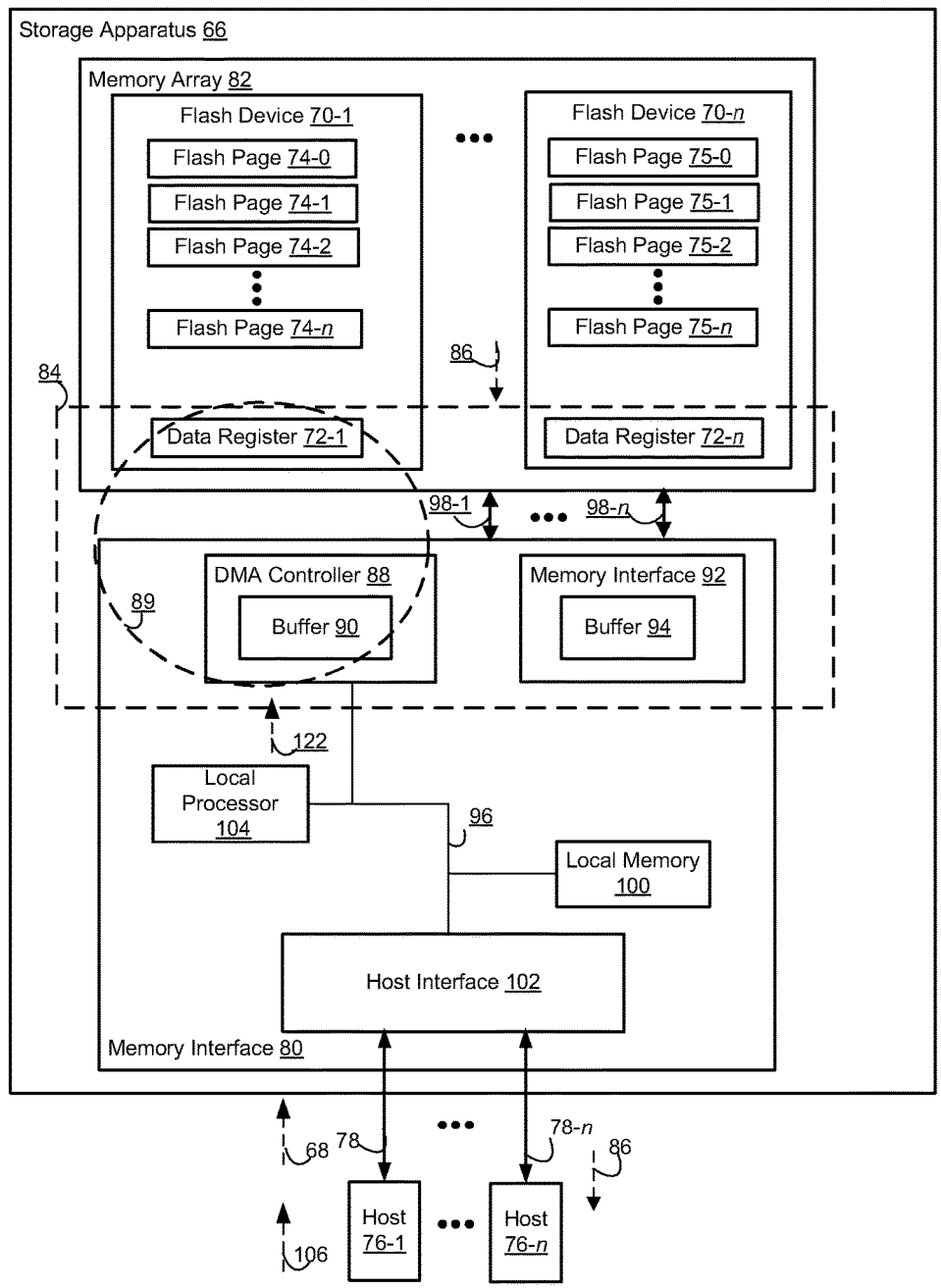
FIG. 3 is a block diagram of a reduced latency memory interface for use in a storage apparatus in accordance with a third embodiment of the present invention.

FIG. 3 illustrates another embodiment of a storage apparatus 66 that supports prefetching transactions and that employs a reduced latency memory interface 80 in accordance with another embodiment of the present invention. Storage apparatus 66 includes a memory array 82 coupled to a memory interface 80 via a memory bus 98. Memory interface 80 is responsive to a memory read transaction request 68 sent via bus 78 from a host 76-1 by enabling storage apparatus 66 to perform a reduced latency memory transaction in response to receiving a second memory read transaction request 106.

Memory interface 80 includes a DMA controller 88, flash memory controller 92, system bus 96, local memory 100, host interface 102 and local processor 104. Host interface 102 allows at least one device, such as host 76-1, to communicate with devices within storage apparatus 66. These devices may include local processor 104, local memory 100 and DMA controller 88 of memory interface 80. For example, memory read transaction request 68 may be received by memory interface 80 through host interface 102, permitting memory interface 80 to process this request as disclosed herein. System bus 96 is a conduit for transferring data between DMA controller 88, local processor 104, local memory 100 and host interface 102. Local processor 104, host interface 102 and DMA controller 88 may access local memory 100 via system bus 96 as needed. Local memory 100 may be implemented using any form of memory, such as various types of DRAM, non-volatile memory and the like.

Memory array 82 includes at least one flash device, such as flash devices 70-1 through 70-n, where n may be any number greater than zero (0). Each flash device may include flash pages and data registers. For example, flash devices 70-1 and 70-n may each respectively include flash pages 74-0 through 74-n, flash pages 75-0 through 75-n, and data registers 72-1 through 72-n. In this embodiment, data registers form part of buffer set 84. Memory array 82, host 76-1 through 76-n, bus 78 through 78-n, buffer set 84, memory read transaction request 68, second memory read transaction request 106 and memory bus 98-1 through 98-n may be respectively implemented to have substantially the same function and structure as memory array 50, host 42-1 though 42-n, bus 54 through 54-n, buffer set 52, memory read transaction request 36, second memory read transaction request 64 and memory bus 46-1 though 46-n respectively, disclosed above with respect to FIG. 2.

Host 76-1 sends memory read transaction request 68 to storage apparatus 66 for data located in memory array 82. Operating under program control, local processor 104 analyzes and responds to memory read transaction request 68 by generating DMA instructions that will cause DMA controller 88 to read this data from memory array 82 through memory controller 92. If this data is available, memory interface 92 retrieves this data, which is transferred to local memory by DMA controller 88, and eventually transferred to host 76-1 via host interface 102. Data obtained during this memory read transaction request is hereinafter named "read data".

Local processor 104 also identifies "prefetch data". Prefetch data is any data currently stored in memory array 82 that meets a prefetch selection criterion. This prefetch selection criterion may include a relationship between the read data and any stored data. For example, this prefetch selection criterion may be met if stored data exists that has a memory address within a selected memory address range from the memory address of the read data. In another example, memory interface 80 determines whether this prefetch selection criterion is met by determining whether any stored data exists in memory array 82 that has a memory address within the same page as a memory address associated with the read data. The type of relationship between read data and stored data is not intended to be limiting in any way. Any type of relationship may be used that increases the likelihood that the stored data selected for prefetching will be later requested by a host coupled to a memory interface 80, such as host 76-1.

Local processor 104 may also perform an additional read operation, called an internal read operation. This internal read operation is a process executed by the local processor 104 to retrieve prefetch data 86 from memory array 82. This internal read operation includes local processor 104 sending an instruction, such as instruction 122, to DMA controller 88 to retrieve prefetch data 86 from memory array 82. For example, if memory array 82 addresses stored data by flash page, instruction 122 contains the address of the specific flash page within a flash device that holds prefetch data 86, such as flash page 74-0 and flash device 70-1, respectively. Instruction 122 also causes DMA controller 88 to retrieve prefetch data 86 from the flash page and flash device identified by the address mentioned above.

When DMA controller 88 receives instruction 122, instruction 122 causes DMA controller 88 to use flash memory controller 92 to cause flash device 70-1 to transfer prefetch data 86. The internal read operation also includes local processor 104 allocating a buffer in buffer set 84 to store prefetch data 86. Allocating a buffer as a prefetch buffer may be performed statically, such as at the time of manufacture, dynamically by local processor 104 or both. In one implementation, the number of buffers allocated as prefetch buffers depends on an amount of storage needed for the prefetch data. For example, in FIG. 3, memory interface 84 may allocate data register 72-1 and buffer 90 as storage space suitable for storing prefetch data 86. This action may also render non-allocated buffers, such as data registers 72-n and buffer 94 in buffer set 84 available to storage apparatus 66 for other memory uses. Buffers allocated for storing prefetch data, such as buffer 90 and data register 72-n, are hereinafter called "prefetch buffers". If a host, such as host 76-1, issues a second memory read transaction request 106 for data and this data has been previously stored as prefetch data in a prefetch buffer such as prefetch data 86 in prefetch buffer 89, local processor 104 responds by retrieving prefetch data 86 from prefetch buffer 89 and by placing prefetch data 86 into local memory 100. When local processor 104 determines local memory 100 contains prefetch data 86, local processor 104 forwards prefetch data 86 from local memory 100 to host interface 102, which in turn transfers the prefetch data to host 76-1. One of ordinary skill in the art having the benefit of this disclosure would readily recognize that rather than using local memory to store prefetch data, prefetch data may be sent directly to the host or processed in any other manner envisioned by a user.

Figure 4:
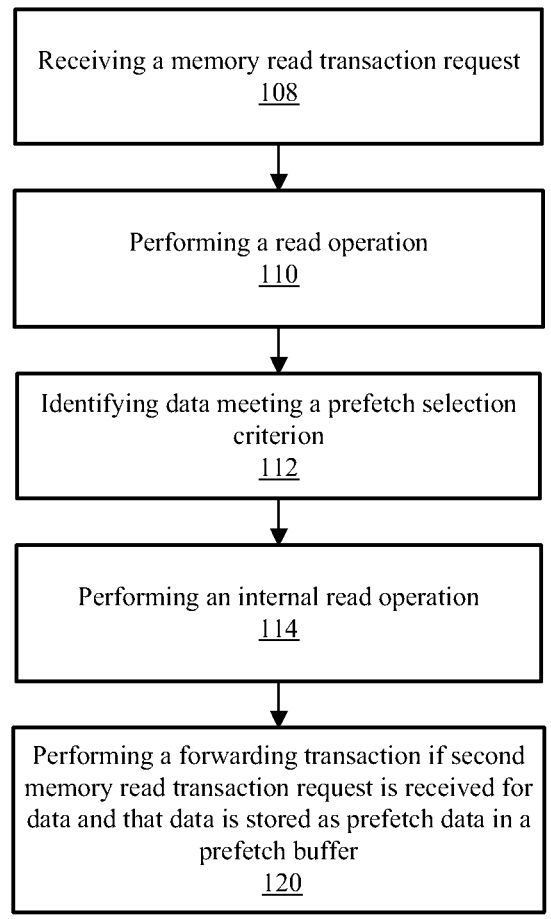
FIG. 4 illustrates a method for using a reduced latency memory interface in a storage apparatus in accordance with a fourth embodiment of the present invention.

FIG. 4 discloses a method for reducing latency in memory read transactions in accordance with another embodiment of the present invention. This method may be performed by using a reduced latency memory interface that is coupled to a memory array that includes a flash device and also coupled to a buffer set that includes a buffer. These elements may be provided in a storage apparatus, such as storage apparatus 10, 34, or 66 in FIGS. 1 through 3, respectively.

Under the method shown, a memory read transaction request is received 108. For example, as shown in FIG. 3, a host 76-1 may send a memory read transaction request 68 to storage apparatus 66, which uses host interface 102 to receive memory read transaction request 68. A read operation is then performed 110. This read operation may be performed by memory interface 80 by obtaining read data requested by host 76-1 from memory array 82. For example, in FIG. 3, memory array 24 responds to memory read transaction request 12 and obtains read data from memory array 26, returning read data to host 18-1 if this data is available.

Local processor 104 identifies 112 data currently stored in memory array 82 that meets a prefetch selection criterion. For example, in FIG. 3, if local processor 104 identifies stored data in memory array 82 that are within a selected address range of the address range of the read data.

If prefetch data is identified, an internal read operation is performed 114. For example, in FIG. 3, memory interface 80 causes a flash device in memory array 82 that holds this prefetch data, such as prefetch data 86, to transfer the prefetch data 86 from a flash page storing the prefetch data. Additionally, the internal read operation includes local processor 104 allocating a buffer as a prefetch buffer in buffer set 84 for storing prefetch data 86. The internal read operation further includes storing prefetch data 86 in a prefetch buffer, such as prefetch buffer 89.

If a second memory read transaction request is received for data and that data is stored as prefetch data in a prefetch buffer, a forwarding transaction is performed 120. For example, referring to FIG. 3, if a second memory read transaction request 106 is received for data and that data is stored as prefetch data 86 in prefetch buffer 89, local processor 104 responds to memory read transaction request 106 and retrieves prefetch data 86 from prefetch buffer 89. Local processor 104 forwards prefetch data 86 from prefetch buffer 89 to local memory 100. Local processor 104 forwards prefetch data 86 from local memory 100 to host 76-1. This transfer of prefetch data 86 from buffer set 84 to local memory 100 is not depicted in FIG. 3 to avoid overcomplicating this herein disclosure. In this example, flash devices 14-1 through 14-n function as mass storage devices. However, in another embodiment (not shown), these flash devices may function as a cache to another type of storage device, such as a set of HDDs arranged in a RAID, JBOD or other configuration. This set of HDDs is not shown in the drawings to avoid overcomplicating the herein disclosure, but may be included as part of the memory array, such as memory array 82 in FIG. 4.

While the present invention has been described in particular embodiments, it should be appreciated that the present invention should not be construed as limited by such embodiments. Rather, the present invention should be construed according to the claims below.

We claim:

1. A storage apparatus for performing reduced memory read transactions, said storage apparatus responsive to memory transaction requests from at least one host, the storage apparatus comprising:
   a memory array comprising a plurality of flash memory devices, said plurality of flash memory devices includes a first flash memory device, said first flash memory device including a data register and non-volatile memory cells;
   a memory interface coupled to said memory array, wherein said memory interface comprises a local processor, a Direct Memory Access (DMA) controller and a flash memory controller, and wherein said DMA controller comprises a first buffer and wherein said flash memory controller comprises a second buffer;
   a buffer set that includes a plurality of buffers that are suitable for use as prefetch buffers, at least some of said buffer set included in said memory interface;
   said buffer set comprising said first buffer in said DMA controller in said memory interface, said second buffer in said flash memory controller, and said data register in said first flash memory device such that said first buffer, said second buffer, and said data register are used as said prefetch buffers;
   wherein said memory interface allocates said prefetch buffers in said buffer set, said prefetch buffers including said first buffer in said DMA controller, said second buffer in said flash memory controller, and said data register so that said buffer set includes said prefetch buffers allocated for storing prefetch data and at least one non-allocated buffer that is available to said storage apparatus for other memory uses;
   wherein said memory interface is configured to identify stored data that meets a prefetch selection criterion and wherein said stored data are stored in said memory array;
   wherein, in response to receiving a memory read transaction request, said memory interface performs a read operation wherein said DMA controller reads said stored data from said memory array through said flash memory controller and, if said memory interface identifies said stored data that meets said prefetch selection criterion in said memory array, said memory interface performs an internal read operation that includes allocating said prefetch buffers in said buffer set and storing said stored data in at least one of said prefetch buffers as said prefetch data; and
   wherein, if said memory interface receives a second memory read transaction request for read data and if said read data is currently available as said prefetch data in at least one of said prefetch buffers, said memory interface responds to said second memory read transaction request by performing a forwarding transaction that includes said local processor retrieving said prefetch data from at least one of said prefetch buffers and said local processor forwarding said prefetch data to said host, reducing read latency of said second memory read transaction request.

2. The storage apparatus of claim 1, wherein said DMA controller reads data from said first flash memory device in said memory array through said flash memory controller.

3. The storage apparatus of claim 1, wherein said memory interface further includes a host interface for receiving said memory read transaction request from said host.

4. The storage apparatus of claim 1, wherein said DMA controller uses said flash memory controller to transfer said prefetch data from said memory array.

5. The storage apparatus of claim 1, wherein said buffer set comprises said first buffer which comprises a first fixed buffer from said DMA controller.

6. The storage apparatus of claim 1, wherein said buffer set includes a second fixed buffer from said flash memory controller.

7. The storage apparatus of claim 1, wherein said first flash memory device contains at least one flash page.

8. The storage apparatus of claim 1, wherein said storage apparatus includes a memory bus for coupling said memory array to said memory interface.

9. The storage apparatus of claim 1, wherein said storage apparatus includes a bus for receiving said memory read transaction request from said host and sending data from the storage apparatus to said host.

10. The storage apparatus of claim 1, wherein said storage apparatus includes a system bus for receiving and sending data between said local processor, said DMA controller, a local memory, and a host interface.

11. The storage apparatus of claim 1 wherein said memory interface includes said DMA controller, said local processor, a host interface and a local memory coupled together through a system bus; and
said memory interface further includes said flash memory controller coupled to said DMA controller and to said memory array through a memory bus.

12. The storage apparatus of claim 1, wherein said buffer set includes another data register in another flash memory device in said memory array.

13. A method for reducing latency in memory read transactions, the method comprising:
using a low latency memory interface coupled to a memory array comprising a plurality of flash memory devices, said plurality of flash memory devices includes a first flash memory device, said first flash memory device includes a data register and non-volatile memory cells;
wherein said memory interface comprises a buffer set that includes a plurality of buffers that are suitable for use as prefetch buffers, wherein said memory interface comprises a local processor, a Direct Memory Access (DMA) controller and a flash memory controller, and wherein said DMA controller comprises a first buffer and wherein said flash memory controller comprises a second buffer;
wherein said buffer set comprises said first buffer, said second buffer, and said data register such that said first buffer, said second buffer, and said data register are used as said prefetch buffers;
allocating, by said memory interface, said prefetch buffers in said buffer set, said prefetch buffers including said first buffer in said DMA controller, said second buffer in said flash memory controller, and said data register so that said buffer set includes said prefetch buffers allocated for storing prefetch data and at least one non-allocated buffer that is available to said memory interface for other memory uses; and
wherein said memory interface responds to memory read transaction requests from a host, the method further comprising:
receiving, by said memory interface, a memory read transaction request;
performing a read operation in response to said memory read transaction request wherein said DMA controller reads stored data from said memory array through said flash memory controller;
identifying, by said memory interface, said stored data that meets a prefetch selection criterion, wherein said stored data are stored in said memory array;
if said memory interface identifies said stored data that meets said prefetch selection criterion in said memory array, then performing an internal read operation that includes allocating said prefetch buffers in said buffer set and storing said stored data in at least one of said prefetch buffers as said prefetch data; and
if said memory interface receives a second memory read transaction request for read data and if said read data is currently available as said prefetch data in at least one of said prefetch buffers, then performing a forwarding transaction that includes said local processor retrieving said prefetch data from at least one of said prefetch buffers and said local processor forwarding said prefetch data to said host.

14. The method of claim 13 wherein said prefetching selection criterion is met if said prefetch data is associated with a memory address within a same page as a memory address associated with said read data.

15. The method of claim 13 wherein said prefetch selection criterion is met if said prefetch data is associated with a memory address within a same flash memory device as a memory address associated with data read during a response to said memory read transaction request.

16. The method of claim 13 wherein said prefetch selection criterion is met if a memory address of said prefetch data differs within a selected memory address range from a memory address of data read during a response to said memory read transaction request.

17. The method of claim 13 wherein a response to said second memory read transaction request includes transferring said prefetch data from at least one of said prefetch buffers to a local memory.

18. The method of claim 17 wherein a response to said second memory read transaction request includes forwarding said prefetch data from said local memory to said host.

19. An article of manufacture, comprising:
a non-transitory computer-readable medium having stored thereon instructions operable to permit an apparatus to perform a method comprising:
receiving, by a memory interface, a memory read transaction request from a host;
wherein said memory interface is coupled to a memory array comprising a plurality of flash memory devices, said plurality of flash memory devices includes a first flash memory device, wherein said first flash memory device comprises a data register and non-volatile memory cells;
wherein said memory interface comprises a buffer set that includes a plurality of buffers that are suitable for use as prefetch buffers;
wherein said memory interface comprises a local processor, a Direct Memory Access (DMA) controller and a flash memory controller, and wherein said DMA controller comprises a first buffer and wherein said flash memory controller comprises a second buffer;
wherein said buffer set comprises said first buffer, said second buffer, and said data register such that said first buffer, said second buffer, and said data register are used as said prefetch buffers;
allocating, by said memory interface, said prefetch buffers in said buffer set, said prefetch buffers including said first buffer in said DMA controller, said second buffer in said flash memory controller, and said data register so that said buffer set includes said prefetch buffers allocated for storing prefetch data and at least one non-allocated buffer that is available to said memory interface for other memory uses;

performing a read operation in response to said memory read transaction request wherein said DMA controller reads stored data from said memory array through said flash memory controller;

identifying, by said memory interface, said stored data that meets a prefetch selection criterion, wherein said stored data are stored in said memory array;

performing an internal read operation that includes allocating said prefetch buffers in said buffer set and storing said stored data in at least one of said prefetch buffers as said prefetch data if said memory interface identifies said stored data that meets said prefetch selection criterion in said memory array; and performing a forwarding transaction that includes said local processor retrieving said prefetch data from at least one of said prefetch buffers and said local processor forwarding said prefetch data to said host if said memory interface receives a second memory read transaction request for read data and if said read data is currently available as said prefetch data in at least one of said prefetch buffers.

20. The article of manufacture of claim 19, wherein said DMA controller reads data from said first flash memory device in said memory array through said flash memory controller.

21. A storage apparatus for performing reduced latency memory read transactions, the storage apparatus comprising:
a memory array including a plurality of non-volatile memory devices;
a memory interface coupled by a memory bus to the memory array and responsive to memory read transaction requests;
the memory interface coupled by a bus to a host during a transmission of memory transaction requests from the host to the memory interface;
the memory interface including a Direct Memory Access (DMA) controller comprising a first buffer and a flash memory controller comprising a second buffer; and
wherein the memory interface allocates a plurality of prefetch buffers in a buffer set, the plurality of prefetch buffers including the first buffer in the DMA controller and the second buffer in the flash memory controller so that the buffer set includes the plurality of prefetch buffers allocated for storing prefetch data and one or more non-allocated buffers available to the storage apparatus for other memory uses;
the memory interface configured to perform a read operation on the memory array in response to a memory read transaction request and configured to perform an internal read operation if the memory interface identifies stored data, in the memory array, meeting a prefetch selection criterion;
the internal read operation comprising the memory interface allocating a data store in the buffer set and storing the stored data in the data store as the prefetch data available to a second memory read transaction.

22. A method of performing reduced latency memory read transactions in a storage apparatus, the method comprising:
receiving, by a memory interface, a memory read transaction request from a host and performing, by the memory interface, a read operation on a memory array; and performing, by the memory interface, an internal read operation if stored data, in the memory array, meets a prefetch selection criterion;
wherein performing the internal read operation comprises:
allocating a data store in a buffer set and storing the stored data in the data store as a prefetch data;
the memory array including a plurality of non-volatile memory devices;
the memory interface coupled by a bus to the host during a transmission of memory transaction requests from the host to the memory interface;
the memory interface including a Direct Memory Access (DMA) controller comprising a first buffer and a flash memory controller comprising a second buffer;
wherein the memory interface, coupled by a memory bus to the memory array, allocates a plurality of prefetch buffers in the buffer set, wherein the plurality of prefetch buffers includes the first buffer in the DMA controller and the second buffer in the flash memory controller so that the buffer set includes the plurality of prefetch buffers allocated for storing the prefetch data available to a second memory read transaction and one or more non-allocated buffers available to the storage apparatus for other memory uses.

23. An article of manufacture, comprising:
a non-transitory computer-readable medium having stored thereon instructions operable to permit a storage apparatus to perform a method comprising:
receiving, by a memory interface, a memory read transaction request from a host and performing, by the memory interface, a read operation on a memory array; and
performing, by the memory interface, an internal read operation if stored data, in the memory array, meets a prefetch selection criterion;
wherein performing the internal read operation comprises:
allocating a data store in a buffer set and storing the stored data in the data store as a prefetch data;
the memory array including a plurality of non-volatile memory devices;
the memory interface coupled by a bus to the host during a transmission of memory transaction requests from the host to the memory interface;
the memory interface including a Direct Memory Access (DMA) controller comprising a first buffer and a flash memory controller comprising a second buffer;
wherein the memory interface, coupled by a memory bus to the memory array, allocates a plurality of prefetch buffers in the buffer set, wherein the plurality of prefetch buffers includes the first buffer in the DMA controller and the second buffer in the flash memory controller so that the buffer set includes the plurality of prefetch buffers allocated for storing the prefetch data available to a second memory read transaction and one or more non-allocated buffers available to the storage apparatus for other memory uses.

* * * * *